March 15, 1949.  H. A. W. KLINKHAMER  2,464,320
STRUCTURE OF DYNAMOELECTRIC MACHINES
Filed April 25, 1946
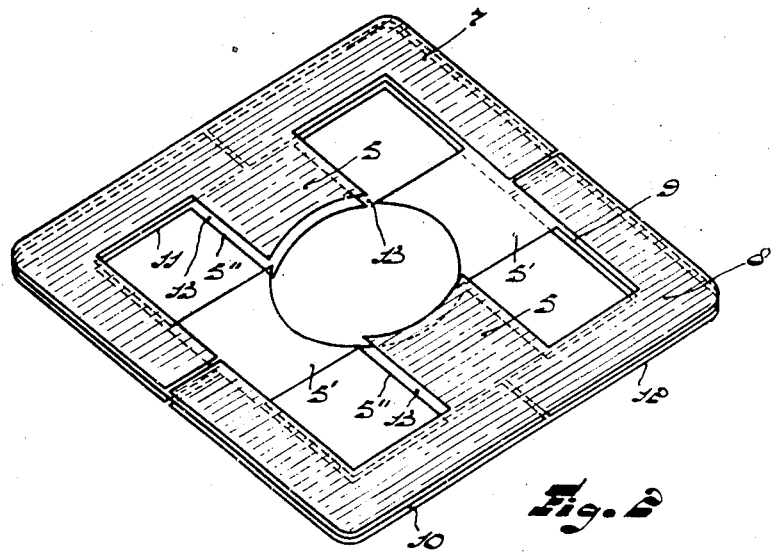
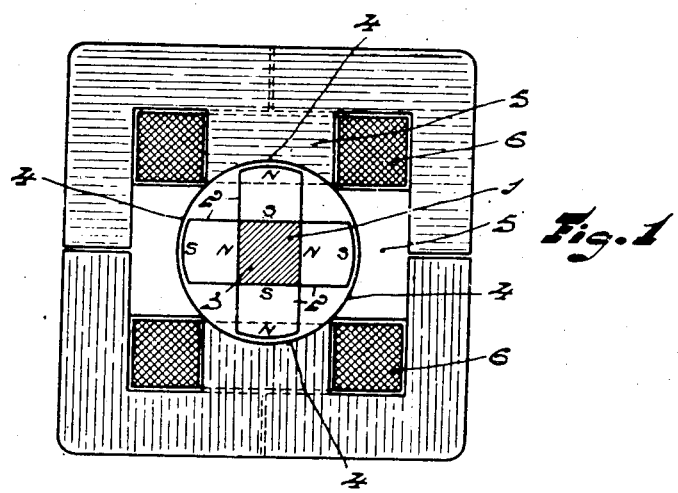
INVENTOR
HENDRIK ABRAHAM WIJNAND KLINKHAMER
BY
ATTORNEY Patented Mar. 15, 1949

2,464,320

UNITED STATES PATENT OFFICE 2,464,320

STRUCTURE OF DYNAMOELECTRIC MACHINES

Hendrik Abraham Wijnand Klinkhamer, Eindhoven, Netherlands, assignor, by mesne assignments, to Hartford National Bank and Trust Company, Hartford, Conn., as trustee Application April 25, 1946, Serial No. 664,721
In the Netherlands June 28, 1941

Section 1, Public Law 690, August 8, 1946
Patent expires June 28, 1961

8 Claims. (Cl. 172—36)

This invention relates to a magnetic circuit, more particularly for an electric machine, comprising a permanent magnetic rotor which consists of a yoke and a number of poles, the poleshoe surfaces jointly constituting a substantially closed cylinder surface.

Such a construction is used, for instance, to prevent demagnetisation of the permanent magnets of the rotor, which measure can practically not be dispensed with when using modern anisotropic magnet steels having a steep demagnetisation curve and $(BH)_{max}$ values to about 4,000,000 and 5,000,000 (and higher).

The present invention has for its object to procure an economical and simple construction of a magnetic circuit of the type referred to above comprising more particularly more than two poles. According to the invention this is made possible by making use of pairs of poles having pole cores whose relative section throughout the length is chosen equal to the pole-shoe surface projected on this section. This permits the use of cheap former-wound coils and the construction of a magnetic circuit in a very short time by means of stampings, without the need of curving them, since the pole cores can be provided from beyond in the coils. Furthermore the invention permits this construction more particularly for a circuit having more than two poles, to be obtained by means of as small as possible a number of uniform stampings.

It is to be remarked that it is known per se to use pole cores having a relative equal section throughout their length, on which former-wound coils are slipped. This, however, is only one feature of the invention which is used in combination with other features to achieve the purpose referred to above. This will be more fully explained in describing the drawing.

According to another feature of the invention the section of the pole cores consists only partly, more particularly for one half, of magnetic material which is possible on account of the large width of the pole core chosen in conjunction with the above step. The construction of the pole cores is preferably made so stiff that the remaining part of the section of the pole cores can be occupied by one or more air-spaces.

In one form of construction of the invention each pole core consists of stampings with relative intermediate spaces corresponding to the thickness of one stamping. To this end, in a magnetic circuit having four poles use is preferably made of equal E-shaped stampings whose middle limbs constitute the pole cores and of which the shape and the size are so chosen that each layer of the magnetic circuit consists of two of such opposed stampings, two succeeding layers being turned through 90° with respect to one another.

Such a construction in the form of a dynamo is shown, by way of example, in Figures 1 and 2 of the accompanying drawing, in which Fig. 1 is an end elevational view of a dynamo electric machine with the rotor yoke shown in section and the stator stampings arranged in accordance with the invention; and Fig. 2 is a view of the stator structure showing the dispositon and arrangement of some of the stampings or laminations for a four-pole dynamo electric machine.

In Fig. 1 the rotor 1 consists of blocks 2 of permanent magnet steel provided on a central piece 3 of soft iron. To avoid demagnetisation of these magnets, which preferably consist of a modern anisotropic magnet steel very liable thereto, a construction is chosen for the magnetic circuit, in which the pole-shoe surfaces 4 jointly constitute a substantially closed cylinder surface. In the case under view, in which more particularly a four-polar dynamo has been chosen, each pole curve consequently amounts to about $$\frac{360°}{4}$$

In this way the poles of the permanent magnets are always bridged by such a magnetic shunt, viz. at the points where the ends of the pole shoes approach each other, as to prevent detrimental demagnetisation.

The section of the pole cores 5 is equal throughout the length and relatively to one another to the pole-shoe surface projected on this section. Consequently this means practically that the pole-shoe surfaces 4, of which the length of arc has the above value, do not project beyond the pole cores having the said relative thickness.

Two former-wound coils 6, which can be made in a cheap manner, are provided about the pole cores, which is possible since the pole cores, owing to the equal section throughout, also at the pole shoes, can be slipped from beyond through the coils. Owing to the large section of the pole cores these need only partly consist of magnetic material, more particularly for half. In this case the construction is preferably made so stiff that the remaining part of the section of the pole cores is occupied by one or more air-spaces.

In the present form of construction a number of stampings are used for this purpose, which constitute the pole cores with relative intermediate spaces corresponding to the thickness of one stamping.

This will be more fully explained with reference to Fig. 2.

The circuit consists of a number of equal E-shaped stampings of which in any instance two, viz. 7 and 8, are placed one against the other in the manner illustrated in the drawing, the pole cores 5 being slipped through the two coils 6 which, for the sake of clearness, have been omitted in Fig. 2.

Thereupon two other stampings 9 and 10 are placed one against the other in the same way but turned through 90° relatively to 7 and 8 so that the pole cores 5" lie between the coils. Thereupon two stampings 11 and 12 are provided again similarly to the stampings 7 and 8, the pole cores 5" being slipped again through the coils. Thus continuing four pole cores are obtained which consist of stampings with relative intermediate spaces 13 having a thickness of one stamping. Consequently the stampings 5 and 5' of the pole cores are not supported except at one end. However, the construction has appeared to be sufficiently stiff for the avoidance of humming. In principle, of course it is possible to use a support, e. g. by means of thin plates of non-magnetic material between the free ends of the pole cores, but this constitutes an undue complication of the construction. In this manner pole cores are obtained which are alternately wound and unwound as shown in Fig. 1. Furthermore it appears from this figure that the pole cores, inclusive of the pole shoes, may be covered by windings along their full lengths so that a very high filling factor is obtained. In that case, however, it is necessary to dispose the rotor in position during the construction of the magnetic circuit. The fact that the rotor is enclosed between the coils after construction of the magnetic circuit, does not constitute a drawback of this construction since the rotor, in order to prevent demagnetisation of the magnets, may not be removed from the magnetic circuit with the bridging magnetic shunts, unless the rotor is re-magnetised later on after re-introduction into the circuit.

If this should be undesirable for other reasons the upper coil 6, for instance, may be bent upwards at the center in such manner that the end 4 of the pole shoe gets free and the rotor is allowed to pass.

Although, in principle, all of the pole cores can be provided with a winding, the use of alternately wound and unwound pole cores is to be preferred in conjunction with a simple shape of the coil and a high filling factor, as well as from the point of view of economical manufacture since, of course, the construction of a double-sized coil is simpler and cheaper than that of two half coils.

It is still to be remarked that in technical respect the construction described is identical to a construction in which a coil is provided on each coil core.

What I claim is:

1. A stator for a dynamo electric machine of N-poles, where N is even and more than two, comprising an assembly of stacked congruent stampings, each stamping having a base portion, a middle leg portion with straight side edges and an arcuate front edge face, and two side wing portions extending from the base portion at an angle corresponding to the internal angle of a regular polygon of N-sides, the front edge face of the middle portion subtending an angle of 360/N degrees about its center of curvature, and the stampings being assembled with N/2 stampings in alternate planar groups with alternate groups disposed 360/N degrees from the next adjacent groups.

2. A stator structure as in claim 1, in which the middle legs are of such length that they meet in the assembly to place the end edges of their arcuate faces in close juxtaposition, and the curvature of the arcs is such that in the assembly the arcuate faces are co-axial and are portions of the same cylindrical surface.

3. A stator for a dynamo electric machine comprising an assembly of stacked congruent stampings of E-shape in which all three legs have straight side edges and the middle leg has a front edge surface of arcuate shape to constitute a pole shoe and subtends an angle of substantially 90° about its center of curvature, and the stampings are assembled in pairs in opposed relation with the legs facing each other, with each pair in the same plane and with alternate pairs transversely disposed.

4. A stator structure as in claim 3 in which the middle legs are of such length that they meet in the assembly to place the end edges of their arcuate faces in close juxtaposition, and the curvature of the arcs is such that in the assembly the arcuate faces are co-axial and are portions of the same cylindrical surface.

5. A stator structure as in claim 4, in which a winding is mounted to encircle the middle legs of each of two opposed groups of assembled stampings.

6. A stator structure as in claim 5 in which the two windings on one opposed set of stampings are held in position by the middle legs of the transversely disposed stampings.

7. A dynamo electric machine comprising a stator as in claim 6 and a rotor consisting of a plurality of permanent magnets and a rotatable support for them, the magnets being arranged to constitute poles of alternate polarity and being dimensioned to extend radially to a small air-gap distance from the arcuate face edges of the stampings.

8. A dynamo electric machine comprising a stator consisting of E-shaped flat stampings disposed in stacked pairs, with each pair in opposed relation in the same plane and with the front edges of the outer legs being juxtaposed to face each other, and with alternate pairs transversely disposed, the center leg of each stamping having straight side edges and a front edge of arcuate shape to constitute a pole shoe and subtending an angle of substantially 90° about its center of curvature which is common to the arcuate edges of all the center legs of the assembled stacked stampings, whereby the pole shoe surfaces in assembly jointly constitute and outline a substantially cylindrical surface, and a rotor consisting of a plurality of permanent magnets and a supporting yoke for them, the magnets being arranged to constitute poles of alternately opposite polarity and dimensioned to rotate past the stator shoe surfaces with a small air gap, the substantially closed cylindrical arrangement of the pole shoe surfaces providing a flux path for the permanent rotor magnets in all positions of those magnets.

HENDRIK ABRAHAM WIJNAND KLINKHAMER.

REFERENCES CITED

The following references are of record in the file of this patent:

UNITED STATES PATENTS

| Number | Name | Date |
|---|---|---|
| 1,239,654 | Williamson | Sept. 11, 1917 |
| 1,980,808 | Leibing | Nov. 13, 1934 |
| 2,131,436 | Howell | Sept. 27, 1938 |